United States Patent
Singleton et al.

(10) Patent No.: US 8,483,347 B2
(45) Date of Patent: Jul. 9, 2013

(54) UPPER INTERNALS ARRANGEMENT FOR A PRESSURIZED WATER REACTOR

(75) Inventors: Norman R. Singleton, Murrysville, PA (US); David A. Altman, Pittsburgh, PA (US); Ching Yu, Murrysville, PA (US); James A. Rex, Trafford, PA (US); David R. Forsyth, Cheswick, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 1608 days.

(21) Appl. No.: 11/733,248

(22) Filed: Apr. 10, 2007

(65) Prior Publication Data

US 2008/0253497 A1   Oct. 16, 2008

(51) Int. Cl.
*G21C 1/04*   (2006.01)

(52) U.S. Cl.
USPC ............ 376/353; 376/245; 376/254; 376/255

(58) Field of Classification Search
USPC .................. 376/303, 245, 254, 203, 255, 353
See application file for complete search history.

(56) References Cited

U.S. PATENT DOCUMENTS

| | | | |
|---|---|---|---|
| 3,827,935 A | 8/1974 | Gruner et al. | |
| 3,849,257 A | 11/1974 | Bevilaqua | |
| 4,173,513 A | 11/1979 | Obermeyer et al. | |
| 5,057,270 A * | 10/1991 | Chevereau | 376/254 |
| 5,078,957 A * | 1/1992 | Tower et al. | 376/254 |
| 5,225,150 A | 7/1993 | Malandra et al. | |
| 5,995,575 A * | 11/1999 | Matsumoto et al. | 376/303 |
| 6,158,706 A * | 12/2000 | Johnson | 248/354.3 |
| 2007/0019774 A1 * | 1/2007 | Yonemoto et al. | 376/254 |

* cited by examiner

*Primary Examiner* — Timothy A Brainard

(57) ABSTRACT

In a pressurized water reactor with all of the in-core instrumentation gaining access to the core through the reactor head, each fuel assembly in which the instrumentation is introduced is aligned with an upper internals instrumentation guide-way. In the elevations above the upper internals upper support assembly, the instrumentation is protected and aligned by upper mounted instrumentation columns that are part of the instrumentation guide-way and extend from the upper support assembly towards the reactor head in hue with a corresponding head penetration. The upper mounted instrumentation columns are supported laterally at one end by an upper guide tube and at the other end by the upper support plate.

15 Claims, 6 Drawing Sheets

UPPER INTERNALS ARRANGEMENT FOR A PRESSURIZED WATER REACTOR

GOVERNMENT INTEREST

This invention was made with government support under Contract No. DE-FC07-051D14636 awarded by the Department of Energy. The government has certain rights to this invention.

BACKGROUND OF THE INVENTION

1. Field of the Invention

This invention relates to water-cooled nuclear reactors, and more particularly to pressurized water reactors having in-core instrumentation that enter the reactor vessel through penetrations from the top of the reactor vessel and are used to monitor the neutron activities and coolant temperature within the core fuel assemblies.

2. Description of the Prior Art

Many water-cooled nuclear reactors utilize a core of vertically-positioned fuel assemblies within a reactor vessel. To monitor the neutron activities and coolant temperature within the core fuel assemblies, movable in-core instrumentation, such as movable neutron detectors, conventionally enter the core from penetrations in the bottom of the vessel. In a few instances in the past leakage occurred at the penetrations at the bottom of the vessel which presented significant repair problems. Accordingly, it would be desirable to have all the in-core instrumentation access the core through penetrations from the top of the reactor vessel.

Thus, it is therefore necessary to provide structure which can satisfactorily guide and protect the in-core instrumentation entering from the top of the vessel and mitigate the potential for leakage.

To provide guidance and protection for the in-core instrumentation the upper core plate, which is just above the fuel assemblies, upward to the penetrations through the vessel head, the existing upper support columns are available in-between the upper core plate and the upper support assembly. What is needed is a structure which provides guidance and protection for the in-core instrumentation in the elevations between the upper support assembly and the penetrations in the vessel head.

SUMMARY OF THE INVENTION

This invention provides upper mounted instrumentation columns that provide guidance and protection for the in-core instrumentation in between the upper support assembly and the penetrations in the reactor vessel head. The design of this invention provides a support system for the upper internals in-core instrumentation that does not require the addition of a substantial framework within the upper internals. The invention design also minimizes additional disassembly requirements to remove and install the upper internals guide tubes in the event maintenance of the guide tubes is required. The main body of each of the upper mounted instrumentation columns is seated at its bottom end at the top of the upper support assembly. Each upper mounted instrumentation column is attached at its upper end to the top of an adjacent upper guide tube through a bracket, for lateral support and alignment. Funnels of varying lengths, depending on the elevations of the matching reactor vessel head penetrations, extend from the top of the upper instrumentation columns to provide continued guidance and protection for the in-core instrumentation between the head penetrations and the top of the upper instrumentation columns.

This structure is an economic and efficient way to provide guidance and protection for the in-core instrumentation. It also provides the least hindrance to the replacement of guide tubes should such replacement be required.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENTS

Figure 1:
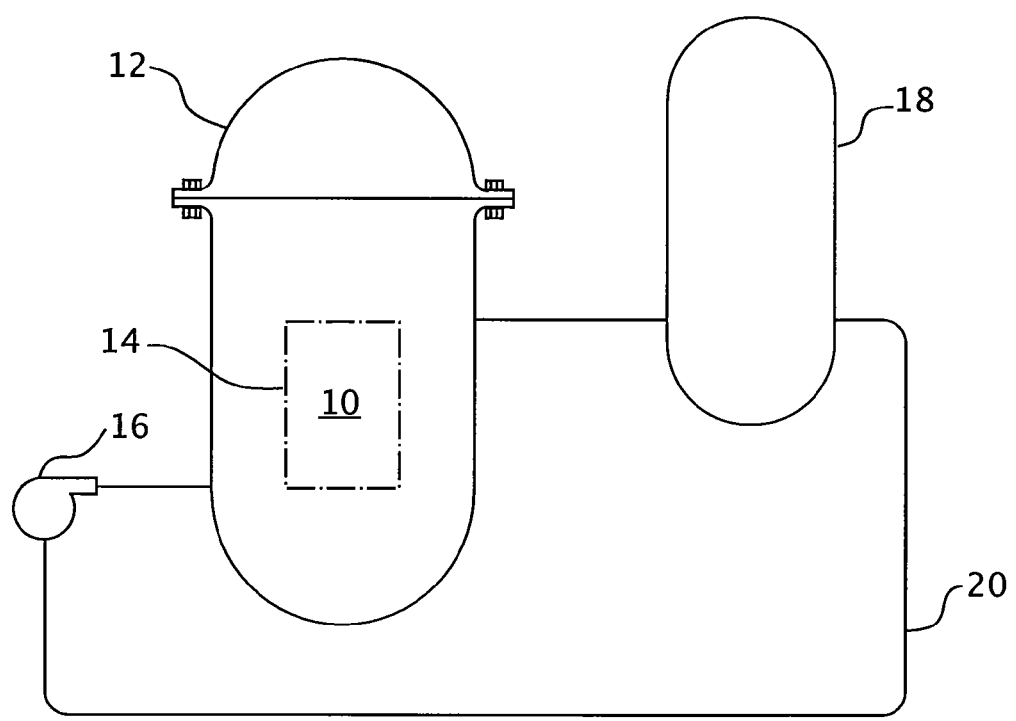
FIG. 1 is a simplified schematic of a nuclear reactor system to which this invention may be applied.

Referring now to the drawings, FIG. 1 shows a simplified nuclear reactor primary system, including a generally cylindrical reactor pressure vessel 10 having a closure head 12 enclosing a nuclear core 14. A liquid reactor coolant, such as water, is pumped into the vessel 10 by pump 16 through the core 34 where heat energy is absorbed and is discharged to a heat exchanger 18, typically referred to as a steam generator, in which heat is transferred to a utilization circuit (not shown) such as a steam driven turbine-generator. The reactor coolant is then returned to the pump 16, completing the primary loop. Typically, a plurality of the above-described loops are connected to a single reactor vessel 10 by reactor coolant piping 20.

Figure 2:
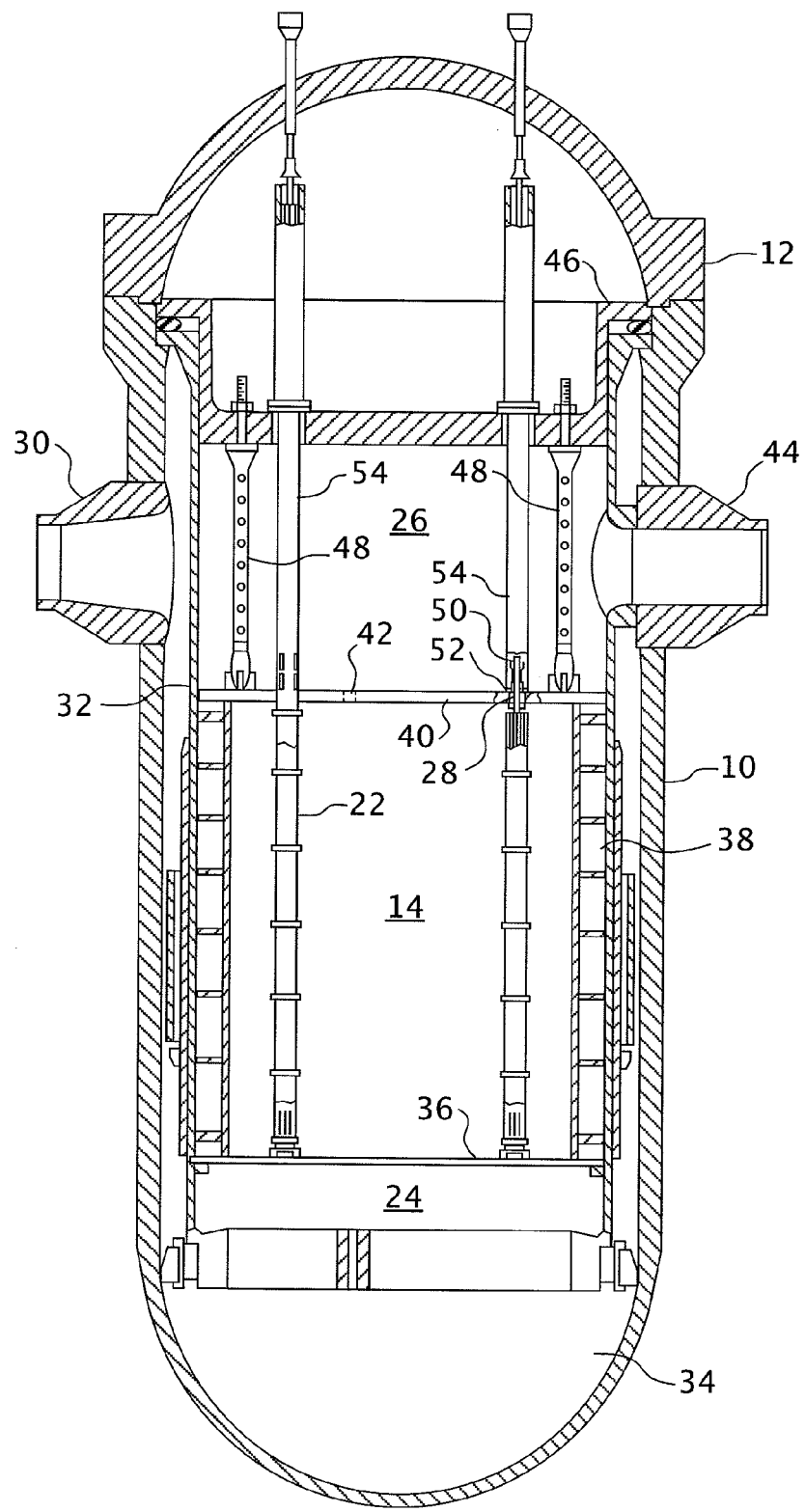
FIG. 2 is an elevational view, partially in section, of a nuclear reactor vessel and internal components incorporating this invention.

A conventional reactor design is shown in more detail in FIG. 2. As previously mentioned, though not shown in FIG. 2, in a conventional pressurized water reactor design, the movable in-core neutron detectors enter the core from the bottom of the reactor through tubes that extend from penetrations in the vessel bottom to the lower core plate 36 where they mate with the instrumentation thimbles within the fuel assemblies. Furthermore, in such a traditional reactor design, the thermocouples that measure core temperature enter the upper head 12 through a single penetration and are distributed by a yoke or cable conduit, such as is shown in U.S. Pat. No. 3,827,935, to the individual support columns 48 and thereby to the various fuel assemblies.

In addition to the core 14 comprised of a plurality of parallel, vertical co-extending fuel assemblies 22, for purposes of this description, the other vessel internal structures can be divided into the lower internals 24 and the upper internals 26. In conventional designs, the lower internals function to support, align and guide core components and instrumentation, as well as to direct coolant flow within the vessel. The upper internals restrain or provide a secondary restraint for the fuel assemblies 22 (only two of which are shown for simplicity), and support and guide instrumentation and components such as control rods 28.

In the exemplary reactor shown in FIG. 2, coolant enters the vessel 10 through one or more inlet nozzles 30, flows downward about a core barrel 32, is turned 180° in a lower plenum 34, passes upwardly through a lower core support plate 36 upon which the assemblies 22 are seated, and through and about the assemblies. The coolant flow through the core and surrounding area 38 is typically large, in the order of 400,000 gallons per minute at a velocity of approximately 20 feet per second. The resulting pressure drop and frictional forces tend to cause the assemblies to rise, which movement is restrained by the upper internals, including a circular upper core plate 40. Coolant exiting the core 14 flows along the underside of the upper core plate 40 and upwardly through a plurality of perforations 42. The coolant then flows upwardly and radially to one or more outlet nozzles 44.

The upper internals 26 can be supported from the vessel or vessel head and include an upper support assembly 46. Loads are transmitted between the upper support assembly 46 (sometimes referred to as the upper support plate) and the upper core plate 40 primarily by a plurality of support columns 48. A support column is aligned above a selected fuel assembly 22 and perforation 42 in the upper core plate 40.

Rectilinearly movable control rods 28 typically including a drive shaft 50 and a spider assembly 52 of neutron poison rods are guided through the upper internals 26 and into aligned fuel assemblies 22 by control rod guide tubes 54. The guide tubes are fixedly joined to the upper support assembly 46 and connected by a split pin 56 force-fit into the fop of the upper core plate 40. The pin configuration provides for ease of guide tube assembly and replacement if ever necessary, and assures that core loads, particularly under seismic or other high-loading accident conditions, are taken primarily by the support columns 48 and not the guide tubes 54. This assists in retarding guide tube deformation under accident conditions which could detrimentally affect control rod insertion capability.

In accordance with this invention, all of the instrumentation is routed through penetrations in the upper head 12. This structural modification is shown in the elevational view of the upper internals illustrated in FIG. 3. The reactor internals designed in accordance with this invention relocates the instrumentation penetrations from die bottom of the reactor vessel to the reactor vessel head 12. This upper mounted instrumentation utilizes forty-two slender in-core instrumentation assembly column extensions 90 that extend above the upper support assembly 46 towards the vessel head 12 not shown in FIG. 3. These slender columns 90 provide a guide way for the in-core neutron detectors/core exit thermocouple transducers that engage the penetrations through the reactor vessel head 12. The upper mounted instrumentation columns are respectively attached to forty-two individual upper guide tubes 88 which provide lateral support for the upper mounted instrumentation columns 90 and alignment with the penetrations in the reactor vessel head as it is lowered into position. In addition, the natural frequencies of this arrangement do not coincide with the coolant pump rotation frequencies, thus avoiding setting up a resonant vibration that could damage the upper internal components. Thus, in accordance with this invention, forty-two in-core instruments exit the pressure boundary through individual penetrations in the reactor vessel head 12, similar to the 69 control rod drive mechanism drive rods. The forty-two in-core instruments and 69 guide tubes must simultaneously enter the penetrations in the reactor vessel as it is lowered into position following refueling. The instrumentation columns are long slender tubes 90 that require a lateral support to assure alignment, with the reactor vessel head penetrations. The preferred design for the upper mounted instrumentation assembly is to attach each of the forty-two in-core instrumentation assembly column extensions 90 to an adjacent rod cluster control assembly upper guide support tube 88 which can best be seen in FIGS. 4, 5 and 6. The upper guide tube 88 is modified to include a bracket 94 which attaches the in-core instrumentation assembly column extensions 90 to the upper guide tube 88 near the top 92 of the guide tube 88. The bottom end 96 of the in-core instrumentation assembly column extensions 90 are screwed into the upper ends of the upper support columns 48.

The design of this invention has a number of benefits. It takes advantage of the rigid construction of the control rod guide tubes 88 to secure the position of the top end of the instrumentation columns 90 to insure alignment with the reactor vessel head penetrations as the head is lowered onto the vessel. Secondly, it provides lateral support for the instrumentation columns 90 to insure the vibrational responses; i.e., the natural frequencies, are sufficiently removed from the coolant pump excitation frequencies to prevent resonance. Thirdly, this arrangement permits the removal of individual guide tubes, should that be necessary. The design of this invention requires a bracket 94 be welded to an upper surface 92 of the upper control rod guide tube 88. The upper mounted instrumentation column extensions 90 are connected to the peripheral end of the brackets 94 through threaded joints. The bottom 96 of the upper mounted instrumentation columns 90 are threaded into the top end of the support columns 48. There is no wear concern at the bottom 96 of the upper mounted instrumentation column extension at its interface with the support columns 48. Additionally, the major pump frequencies are avoided.

Figure 3:
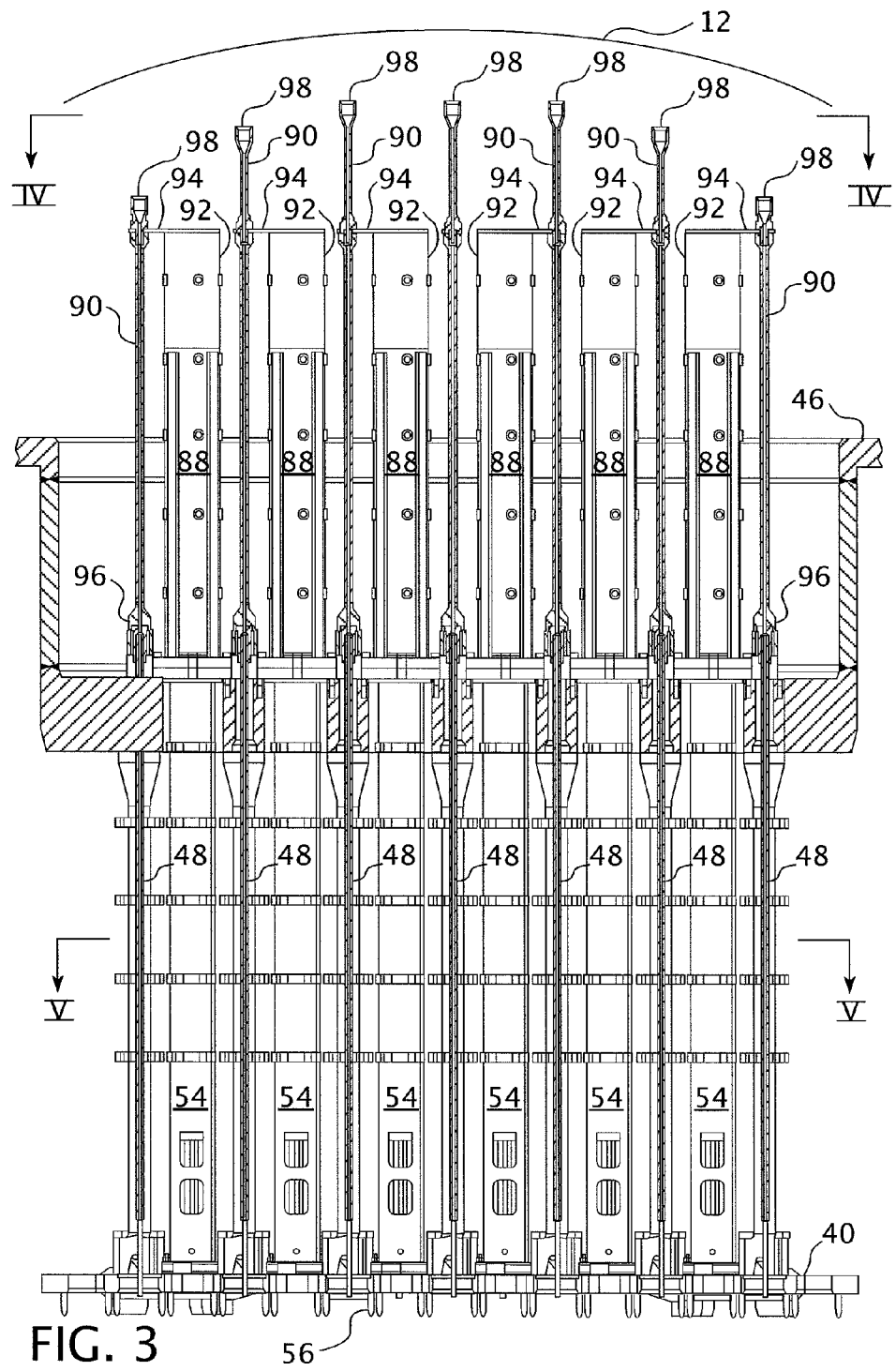
FIG. 3 is an elevational view, partially in section, showing more detail of the upper internals structures of FIG. 1, incorporating this invention.
Figure 4:
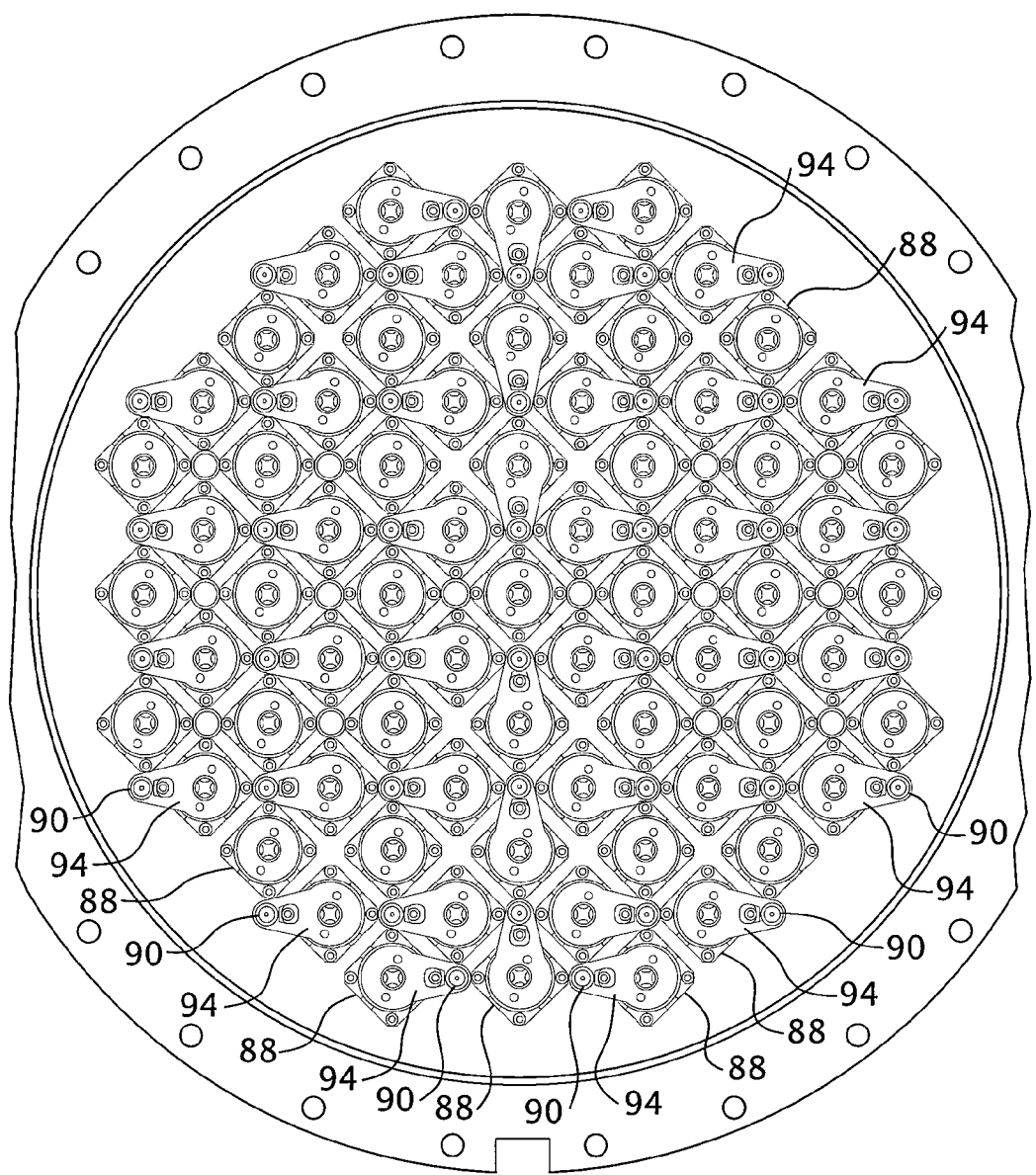
FIG. 4 is a plan view of FIG. 3 taken along the lines IV-IV of FIG. 3.
Figure 5:
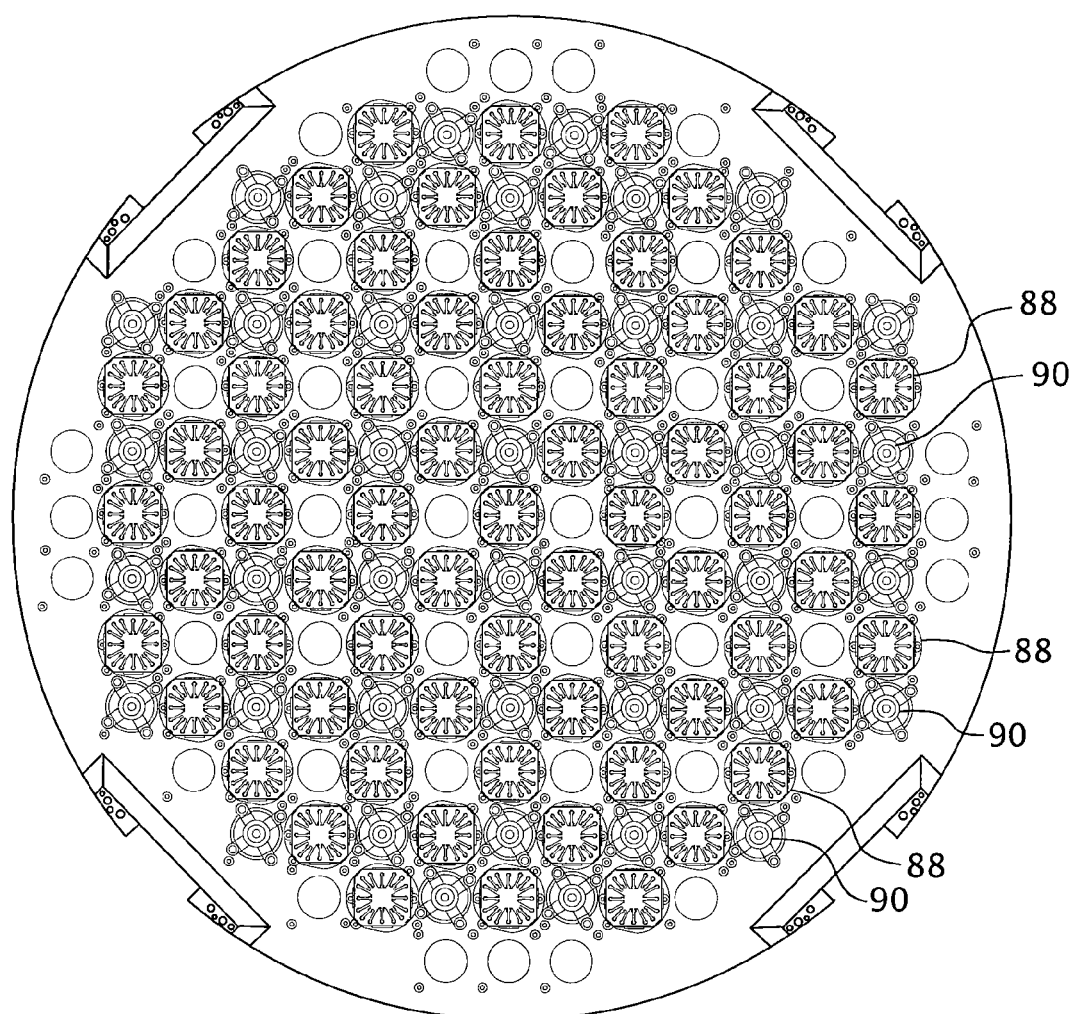
FIG. 5 is a plan view of FIG. 3 taken along the lines V-V.
Figure 6:
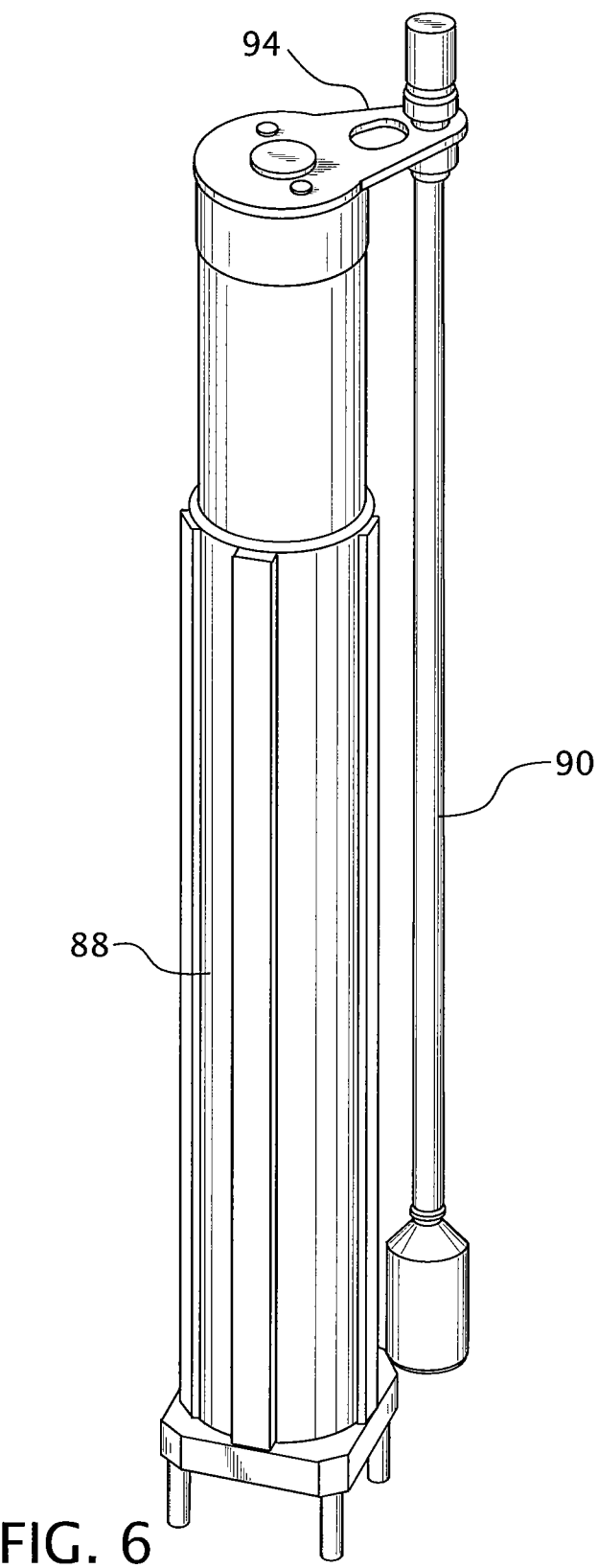
FIG. 6 a perspective view of the upper guide tube and instrument column extension, assembly of this invention.

FIG. 4 is a plan view of the upper internals shown in FIG. 3, taken at an elevation IV-IV and clearly shows the control rod guide members 88 to which the brackets 94 and instrumentation column extensions 90 are attached. FIG. 5 is a plan view of the upper internals shown in FIG. 6, taken along the lines V-V and provides a better view of the upper control rod guides 88 and the support columns 90 at an elevation below the upper support assembly 46. Referring back to FIG. 3, it can be appreciated that the instruments gain access to the instrument thimbles in the fuel assemblies through the reactor head, into the upper funnels 98 of the in-core instrumentation assembly column extensions 90 and down through the support columns 48 where they exit the support columns into the top opening of the instrumentation thimbles in the fuel assemblies. During refueling, the in-core instruments are withdrawn into the head and removed from the upper internals 26 before the head 12 is removed from the vessel 10.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to die scope of the invention which is to be given the full breadth of the appended claims and any and all equivalents thereof.

What is claimed is:
1. A pressurized water nuclear reactor pressure vessel comprising:
  an upper support plate;
  a removable upper head;
  a plurality of rod cluster control assembly upper guide tubes, each guide tube extending from the upper support plate toward the removable upper head; and a plurality of in-core instrumentation assembly column extensions, each column extension continuously extending from and being supported by a horizontal section of the support plate and extending toward the removable upper head to an elevation substantially at or above the rod cluster control assembly upper guide tubing, and each column extension connected by a bracket to one of the upper guide tubes and each column extension provides support for in-core instrumentation over substantially the entire length of the column extension.

2. The pressurized water reactor pressure vessel of claim 1 wherein coolant is conveyed to the reactor pressure vessel by a reactor coolant pump having a rotation frequency and wherein an assembly of the upper guide tube attached by the bracket to the upper mounted instrumentation columns have natural resonant vibration frequencies substantially different from the excitation frequency of the reactor coolant pump.

3. The pressurized water reactor pressure vessel of claim 1 wherein each column extension is connected by bracket to a different one of the upper guide tubes.

4. The pressurized water reactor pressure vessel of claim 1 wherein the column extensions are respectively connected to or adjacent the top of the upper guide tubes.

5. The pressurized water reactor pressure vessel of claim 1 wherein the bracket is welded to the upper guide tube at one end and the column extension is screwed into the bracket at another end.

6. The pressurized water reactor pressure vessel of claim 1 wherein each of the column extensions is fastened at one end to the upper support plate.

7. The pressurized water reactor pressure vessel of claim 1 wherein one end of each of the column extensions is aligned with its own penetration in the upper head.

8. The pressurized water reactor pressure vessel of claim 1 wherein at least some of the in-core instrument assembly column extensions provide moveable in-core detectors access to a nuclear fuel assembly within a core within the pressure vessel.

9. The pressurized water reactor pressure vessel of claim 1 wherein a lower end of the column extensions are respectively fastened to a support column that extends between the upper support plate and an upper core plate.

10. The pressurized water reactor pressure vessel of claim 1 wherein the lower end of the column extensions are respectively screwed into the support columns.

11. The pressurized water reactor pressure vessel of claim 1 wherein at least some of the column extensions extend above the upper guide tubes.

12. The pressurized water reactor pressure vessel of claim 1 wherein the instrumentation assembly column extensions end in funnels between the upper support plate and the removable upper head.

13. The pressurized water reactor pressure vessel of claim 1 further comprising:
a core including a plurality of fuel assemblies;
an upper core plate situated over the fuel assemblies; and
a plurality of support columns extending vertically between the upper core plate at a lower end of the support columns and the upper support plate at an upper end of the support columns, the support columns respectively in line and communicating with a corresponding one of the in-core instrumentation column extensions.

14. The pressurized water reactor pressure vessel of claim 1 wherein the instrumentation assembly column extensions are substantially straight and substantially rigid and guide an instrumentation assembly substantially through the instrumentation assembly column extension's entire length.

15. A pressurized water reactor power generating facility having a pressure vessel comprising:
an upper support plate;
a removable upper head;
a plurality of rod cluster control assembly upper guide tubes, each upper guide tube extending from the support plate toward the removable upper head; and
a plurality of in-core instrumentation assembly column extensions, each column extension continuously extending from the upper support plate toward the removable upper head to an elevation substantially at or above the rod cluster control assembly upper guide tubing, and each column extension connected by a bracket to one of the upper guide tubes and each column extension provides support for in-core instrumentation over substantially the entire length of the column extension.

\* \* \* \* \*